United States Patent
Katou et al.

(10) Patent No.: US 6,621,032 B1
(45) Date of Patent: Sep. 16, 2003

(54) WIRE CUTTING ELECTRIC DISCHARGING MACHINING METHOD BASED UPON PREDICTED DISCHARGE GAP

(75) Inventors: Kaori Katou, Tokyo (JP); Miyuki Maeda, Tokyo (JP); Shigeaki Naka, Tokyo (JP); Yasuhiro Kawai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/763,756

(22) PCT Filed: Aug. 28, 1998

(86) PCT No.: PCT/JP98/03827

§ 371 (c)(1),
(2), (4) Date: Feb. 27, 2001

(87) PCT Pub. No.: WO00/12251

PCT Pub. Date: Mar. 9, 2000

(51) Int. Cl.[7] .............................. B23H 1/00; B23H 7/02; B23H 7/06
(52) U.S. Cl. ...................... 219/69.12; 700/162; 700/184
(58) Field of Search ........................... 219/69.12, 69.17; 700/162, 184

(56) References Cited

U.S. PATENT DOCUMENTS

| | | | | |
|---|---|---|---|---|
| 4,571,670 A | * | 2/1986 | Kishi et al. | 700/184 |
| 4,713,517 A | * | 12/1987 | Kinoshita | 219/69.12 |
| 5,041,984 A | * | 8/1991 | Watanabe | 700/162 |
| 5,083,000 A | * | 1/1992 | Sakaue | 219/69.12 |
| 5,218,548 A | * | 6/1993 | Sumita et al. | 700/162 |
| 5,237,145 A | * | 8/1993 | Magara et al. | 219/69.12 |
| 6,549,824 B1 | * | 4/2003 | Satou et al. | 700/162 |

FOREIGN PATENT DOCUMENTS

| | | | | |
|---|---|---|---|---|
| JP | 61-178117 A | * | 8/1986 | 219/69.13 |
| JP | 61-236434 A | * | 10/1986 | |
| JP | 5-277835 | | 10/1993 | |
| JP | 6-262436 A | * | 9/1994 | |
| JP | 6-262438 | | 9/1994 | |
| JP | 10-277835 | | 1/1998 | |
| JP | 4-10-49210 A | * | 2/1998 | |

OTHER PUBLICATIONS

International Search Report.

\* cited by examiner

*Primary Examiner*—Geoffrey S. Evans
(74) *Attorney, Agent, or Firm*—Sughrue Mion, PLLC

(57) ABSTRACT

A predicted discharge gap $g(n)$ and a predicted minimum gap $gmax(n)$ between a workpiece (1) and a wire electrode (2) to prevent a short-circuit are added to the machining conditions, and read in doing a program check, and a predicted allowance for machining $m(n)$ in the nth machining is calculated from the predicted discharge gap $g(n)$, a correction amount $y(n)$ of the wire electrode (2) for the workpiece (1) and a wire electrode diameter d, in which the predicted allowance for machining $m(n)$ in the nth machining and the predicted minimum gap $gmax(n)$ between the workpiece and the wire electrode to prevent short-circuiting in the nth machining are displayed on a display unit (17).

12 Claims, 11 Drawing Sheets

WIRE ELECTRODE CENTER PATH

WIRE ELECTRODE CENTER PATH IN THE FIRST MACHINING
WIRE ELECTRODE CENTER PATH IN THE SECOND MACHINING
WIRE ELECTRODE CENTER PATH IN THE THIRD MACHINING

WIRE CUTTING ELECTRIC DISCHARGING MACHINING METHOD BASED UPON PREDICTED DISCHARGE GAP

TECHNICAL FIELD

The present invention relates to improvements in a wire discharge machining method and apparatus that allows the shape of a machined workpiece to be predicted and displayed. Throughout the specification, by the phrase "wire discharge machining" it is meant that an electric discharge—occurring between a wire electrode and a workpiece—machines the workpiece.

BACKGROUND OF THE INVENTION

FIG. 8 shows a conventional wire discharge machining apparatus. In FIG. 8, this wire discharge machining apparatus comprises a workpiece 1, a wire electrode 2, a base board 3, an X table 6, a Y table 7, an X-axis servo amplifier 8, a Y-axis servo amplifier 9, a working fluid nozzle 11, a working fluid 12, a numerical control unit 13, a program analysis means 14, a locus movement control means 15, a program locus drawing means 16, a display unit 17, and a drawn locus 18.

The operation will be described below. In FIG. 8, the machining is performed by supplying a working electric power from a working power source, not shown, to a gap between the wire electrode 2 and the workpiece 1 and producing a discharge between them. In this case, the X table 6 and the Y table 7 are driven on the basis of a program stored in the numerical control unit 13, machining the workpiece into a desired shape. That is, the numerical control unit 13 issues a speed signal to the X-axis servo amplifier 8 and the Y-axis servo amplifier 9 to drive a servo motor, not shown, to move the X table 6 and the Y table 7, and move the workpiece 1 fixed in the base board 3 on the X table 6, so that the workpiece is machined.

FIG. 9 shows a positional relation between the wire electrode 2 and the workpiece 1 during the first cut (first machining), in which the center of the wire electrode 2 follows the course of the machining positions calculated by the program analysis means 14. The wire electrode center path is separated an offset value specified from that path calculated by a given program with an offset value of zero. Also, when the workpiece is removed by discharging, a gap produced between the wire electrode and the workpiece is called a discharge gap, the amount of gap being varied depending on the machining conditions.

A second cut (second machining) method has been disclosed as a common machining technique to finish the workpiece with higher precision by performing a second machining using an offset value varied in the same program. The positional relation between the wire electrode and the workpiece in the second machining is shown in FIG. 10. As the machining conditions for use with the second machining, the discharge gap and the offset value are set to the smaller values than with the first machining, to secure an allowance for machining in the second machining. A difference in the offset value between the nth machining and the (n−1)th machining is called an nth correction amount. If the correction amount is not selected to be a suitable value, no discharge is effected at all, or conversely a short-circuit is caused, resulting in a situation of not machining the workpiece.

Assume the distance between the surface of wire electrode and the workpiece before machining to be L, the discharge gap at this time to be G, and the minimum gap between the workpiece and the wire electrode to prevent short-circuiting to be Gmax. An instance where the machining is normally performed is shown in FIG. 11. In FIG. 11, the relation among L, G and Gmax is represented in accordance with an expression that follows.

$$Gmax(2) < L < G(2)$$

where the number n enclosed by parentheses indicates the nth machining.

On the other hand, an instance where the discharge can not be effected owing to too large distance L between the surface of wire electrode and the workpiece before machining is shown in FIG. 12. In this case, the relation between L and G is represented by the following expression.

$$G(2) < L$$

Also, an instance where the discharge is not effected due to too small distance L between the surface of wire electrode and the workpiece before machining to cause a short-circuit is shown in FIG. 13. In this case, the relation between L and Gmax is represented by the following expression.

$$L < Gmax(2)$$

Herein, a method for calculating the wire electrode center path in the program analysis means 14 and displaying it on the display unit 17 before practical machining will be described below. FIG. 14 is a flow chart showing a drawing method of a program check provided inside the numerical control unit 13 of the conventional wire discharge machining apparatus, in which the program check comprises analysis means 21 for reading a command content from the content of a specified program, discrimination means 22 for discriminating whether or not the read command content is an end command, program analysis means 23 for calculating the machining position from the program content, and drawing means 24 for drawing the position analyzed by the program analysis means 23 on the display unit.

The operation will be described below. First, a command in the program specified is read by the analysis means 21 in FIG. 14. If it is discriminated by the discrimination means 22 that the read command is an end command, the program analysis means 23 calculates the machining position followed by the center of the wire electrode, and the drawing means 24 draws a locus with a constant thickness of line on the display unit.

An instance of drawing the locus with this method is shown in FIGS. 15 and 16. FIG. 15 shows a wire electrode center path when the machining is made once, and FIG. 16 shows the wire electrode center path when the machining is made three times.

The conventional wire discharge machining method and apparatus is configured in the above way. Since the drawing is only involved in the wire electrode center path, there was a problem that the finished surface could not be predicted. In the case where the machining is performed multiple times by varying the offset value in the same program, there was another problem that it was not possible to judge whether the sufficient discharge could be effected in each machining with the set correction amount.

DISCLOSURE OF THE INVENTION

This invention has been achieved to solve the above-mentioned problems, and it is a first object of the invention to provide a wire discharge machining method and apparatus which is enabled to discriminate whether or not the finish shape of machined workpiece is produced as specified visually every time of machining.

It is a second object of the invention to provide a wire discharge machining method and apparatus which is enabled to confirm visually the predicted discharge portion every time of machining and determine the correction amount effectively.

According to a first aspect of the invention, a wire discharge machining method includes adding a predicted discharge gap to the machining conditions and reading the amount of predicted discharge gap in doing a program check, and displaying the predicted discharge gap along with the wire electrode center path on a display unit.

According to a second aspect of the invention, a wire discharge machining apparatus comprises operation means for adding a predicted discharge gap to the machining conditions and reading the amount of predicted discharge gap in doing a program check, and drawing means for displaying the predicted discharge gap along with the wire electrode center path on a display unit.

According to a third aspect of the invention, the wire discharge machining apparatus according to the second aspect of the invention further comprises drawing means for displaying the predicted discharge gap along with the wire electrode center path on the display unit in a different color every time of machining.

According to a fourth aspect of the invention, a wire discharge machining method includes adding a predicted discharge gap to the machining conditions and reading the amount of predicted discharge gap in doing a program check, and displaying the wire electrode center path on a display unit as a thickness of the line drawing the (d+2×g)× drawing scale that is obtained from the predicated discharge gap g and the wire electrode diameter d.

According to a fifth aspect of the invention, a wire discharge machining apparatus comprises operation means for adding a predicted discharge gap to the machining conditions and reading the amount of predicted discharge gap in doing a program check, and drawing means for displaying the wire electrode center path on a display unit as a thickness of the line drawing the (d+2×g)×drawing scale that is obtained from the predicated discharge gap g and the wire electrode diameter d.

According to a sixth aspect of the invention, the wire discharge machining apparatus according to the fifth aspect of the invention further comprises drawing means for displaying the line indicating the wire electrode center path on the display unit in a different color every time of machining.

According to a seventh aspect of the invention, a wire discharge machining apparatus comprises drawing means for displaying a predicted discharge portion on a display unit.

According to an eighth aspect of the invention, the wire discharge machining apparatus according to the seventh aspect of the invention further comprises drawing means for displaying the line indicating the predicted discharge portion on the display unit in a different color every time of machining.

According to a ninth aspect of the invention, a wire discharge machining method includes adding a predicted discharge gap and a predicted minimum gap between the workpiece and a wire electrode to prevent short-circuiting to the machining conditions and reading the amounts of predicted discharge gap and predicted minimum gap in doing a program check, calculating a predicted allowance for machining in the nth machining from the predicted discharge gap, a correction amount of the wire electrode for the workpiece, and the wire electrode diameter, and displaying the predicted allowance for machining in the nth machining, and the predicted minimum gap for the nth machining between the workpiece and the wire electrode to prevent short-circuiting on a display unit.

According to a tenth aspect of the invention, a wire discharge machining apparatus comprises operation means for adding a predicted discharge gap and a predicted minimum gap between the workpiece and a wire electrode to prevent short-circuiting to the machining conditions and reading the amounts of predicted discharge gap and predicted minimum gap in doing a program check, operation means for calculating a predicted allowance for machining in the nth machining from the predicted discharge gap, a correction amount of the wire electrode for the workpiece, and the wire electrode diameter, and drawing means for displaying the predicted allowance for machining in the nth machining, and the predicted minimum gap for the nth machining between the work piece and the wire electrode to prevent short-circuiting on a display unit.

According to an eleventh aspect of the invention, the wire discharge machining apparatus according to the tenth aspect of the invention further comprises drawing means for displaying the line indicating the predicted allowance for machining on the display unit in a different color every time of machining.

According to a twelfth aspect of the invention, the wire discharge machining apparatus according to the eleventh aspect of the invention further comprises drawing means for displaying a portion where the predicted minimum gap for the nth machining between the workpiece and the wire electrode to prevent short-circuiting exceeds the predicted allowance for machining in the (n−1) th machining on a display unit in a different color.

BEST MODE FOR CARRYING OUT THE INVENTION

Embodiment 1

Figure 1:
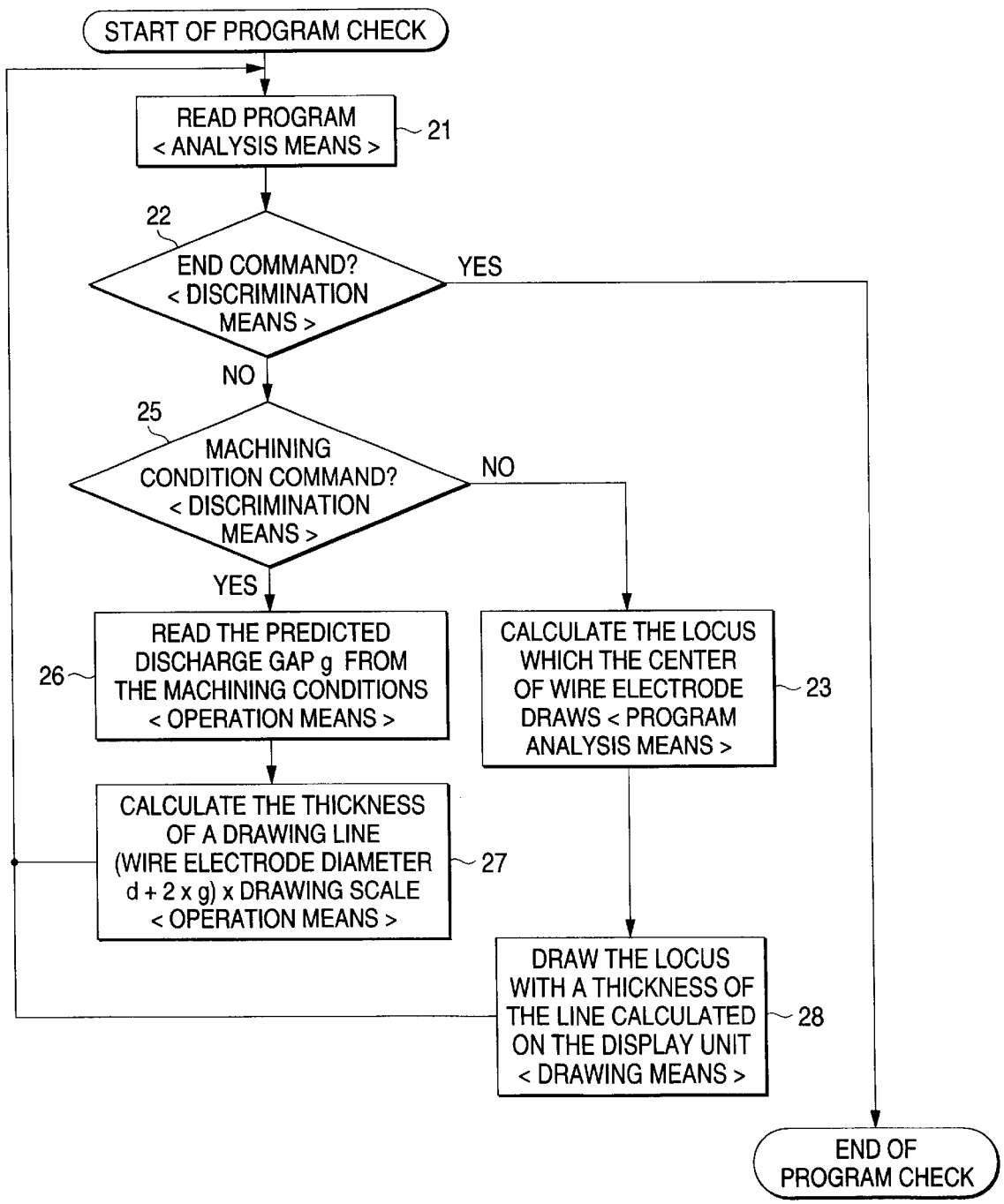
FIG. 1 is a flowchart showing an embodiment 1 of the present invention.
Figure 14:
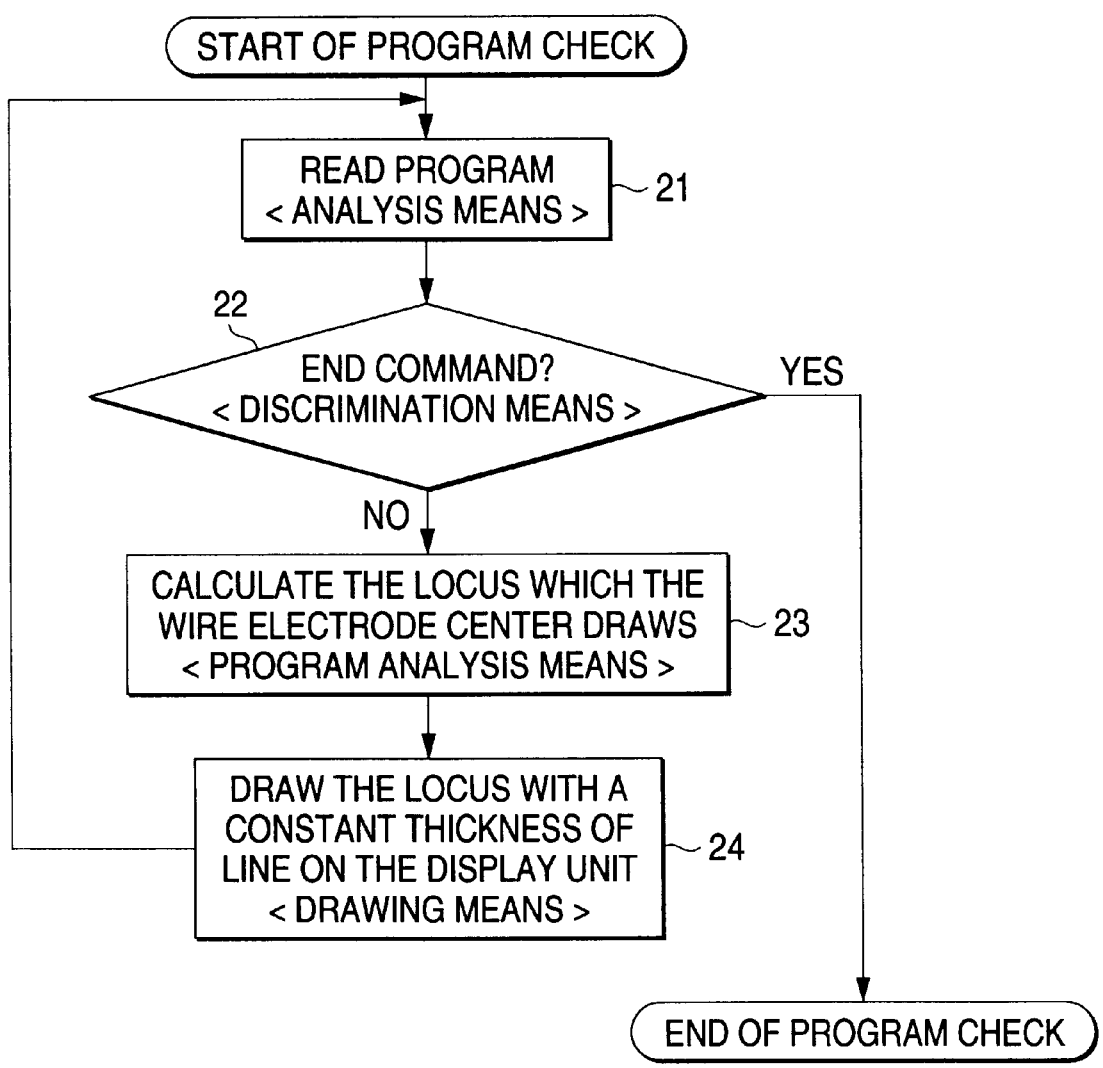
FIG. 14 is a flowchart showing drawing means for the conventional wire discharge machining apparatus.
Figure 15:
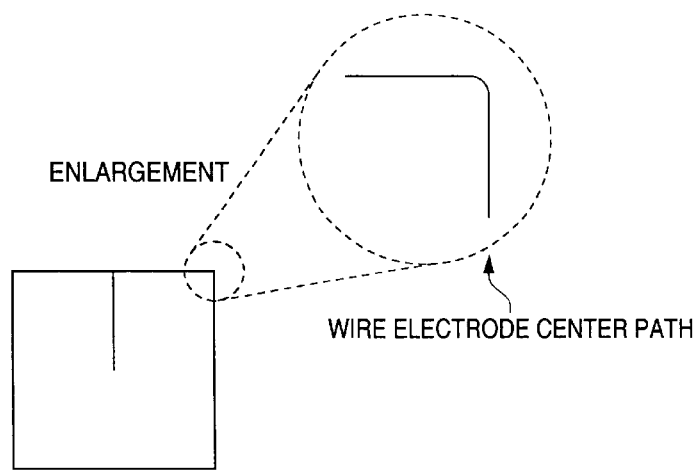
FIG. 15 is a view illustrating a display example when the conventional machining is effected once.
Figure 16:
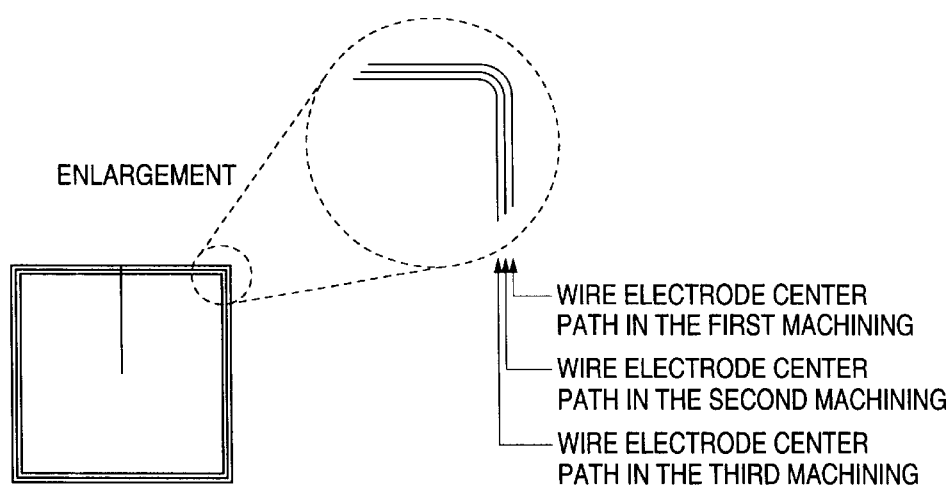
FIG. 16 is a view illustrating a display example when the conventional machining is effected three times.

FIG. 1 is a flowchart showing a drawing method in a wire discharge machining apparatus according to an embodiment 1 of this invention. In FIG. 1, reference numerals 21 to 23 are equivalent to those as explained in the prior art and shown in FIG. 14. Reference numeral 21 denotes analysis means for reading a command content from the content of a specified program; 22 denotes discrimination means for discriminating whether or not the command content read from the specified program is an end command; and 23 denotes program analysis means for calculating the machining position from a movement command in the program. Also, reference numeral 25 denotes discrimination means for discriminating whether or not the command content read from the specified program is a machining condition command; 26 denotes operation means for reading a predicted discharge gap g specified in the program and added to the machining conditions; 27 denotes operation means for calculating the thickness of a line for drawing from the predicted discharge gap g read by the operation means 26 and a wire electrode diameter d being used; and 28 denotes drawing means for drawing the machining position obtained by the program analysis means 23 with a thickness of the line calculated by the operation means 27.

Figure 9:
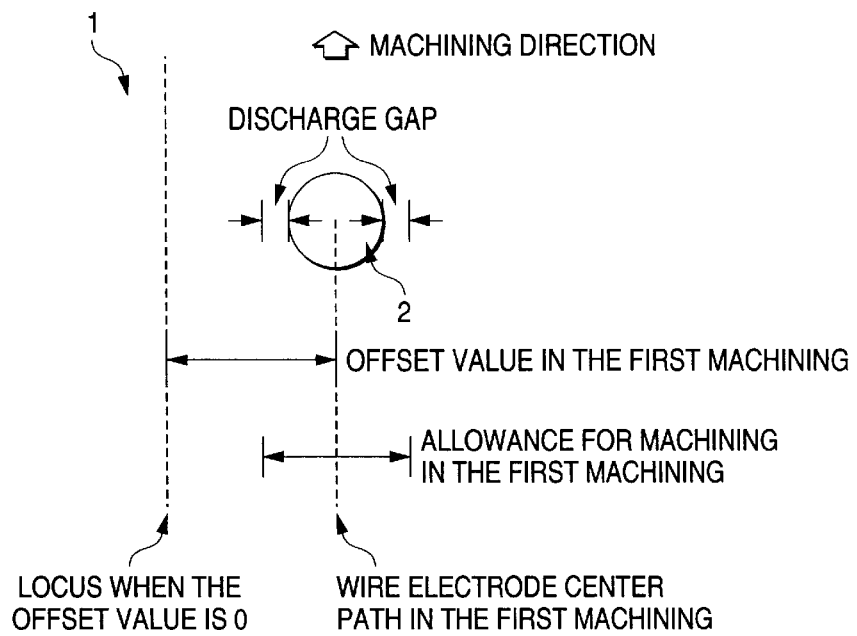
FIG. 9 is a view showing a positional relation between a wire electrode and a workpiece in the first machining.
Figure 10:
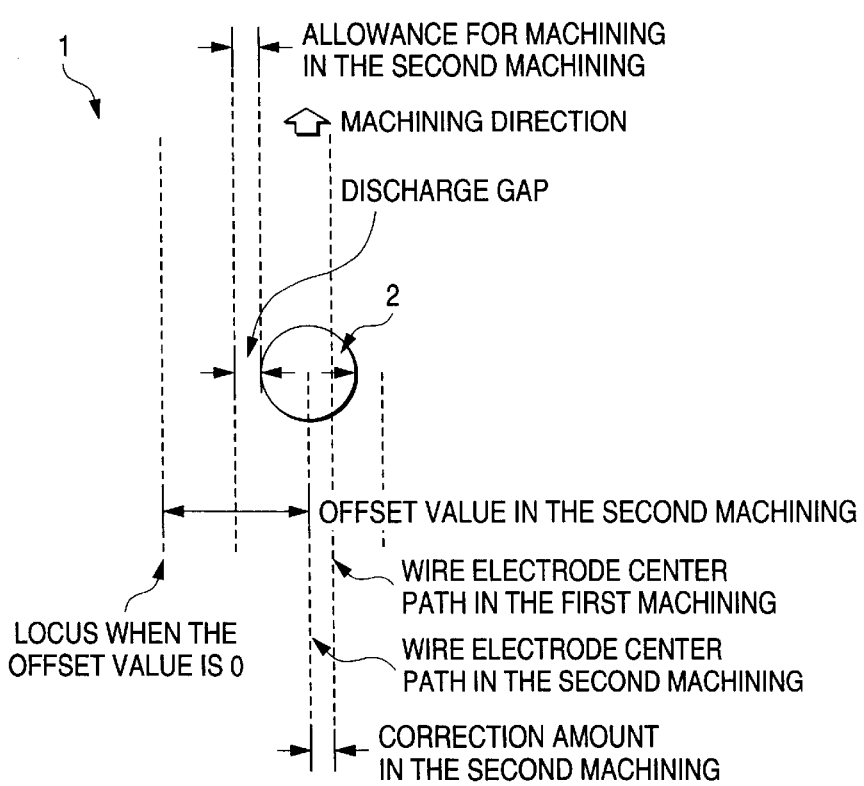
FIG. 10 is a view showing a positional relation between the wire electrode and the workpiece in the second machining.

Herein, a method for determining the predicted discharge gap g added to the machining conditions will be described below. The discharge gap is determined by the machining rate under the same machining conditions. The machining rate is controlled so that an average machining voltage applied between the wire electrode and the workpiece may be constant during the machining in the wire discharge machining. In practical machining, the machining rate may fluctuate depending on the irregular shape of the machined surface, but the target machining rate is determined in advance for each of the machining conditions. Therefore, a predicted discharge gap g for each of the machining conditions can be obtained in such a way that the first machining is made under the machining condition as shown in FIG. 9, or the second and subsequent machining is made under the machining condition as shown in FIG. 10, using each target machining rate, to measure the width of a machined groove and calculate a discharge gap G that is the predicted discharge gap g for each of the machining conditions.

The operation will be described below. In FIG. 1, a command in the program is read by the analysis means 21. If it is discriminated by the discrimination means 22 that the read command is an end command, the drawing process is ended. If the read command is not the end command, discrimination means 25 makes a discrimination whether or not the read command is a machining condition command. If it is discriminated that the read command is the machining condition command, a predicted discharge gap is read from the corresponding machining condition data by the operation means 26. The operation means 27 calculates the thickness of a line for drawing from the predicted discharge gap g read by the operation means 26 and the wire electrode diameter d being used in accordance with the following expression.

(Thickness of line for drawing)=(d+2×g)×drawing scale

Then, control passes back to analysis means 21, in which a next command is read. If it is not discriminated by the discrimination means 25 that the command read by the analysis means 21 is a machining condition command, the program analysis means 23 calculates the machining position in accordance with the command content, and the drawing means draws the machining position on the display unit using the thickness of the line obtained by the calculation means 27.

Figure 2:
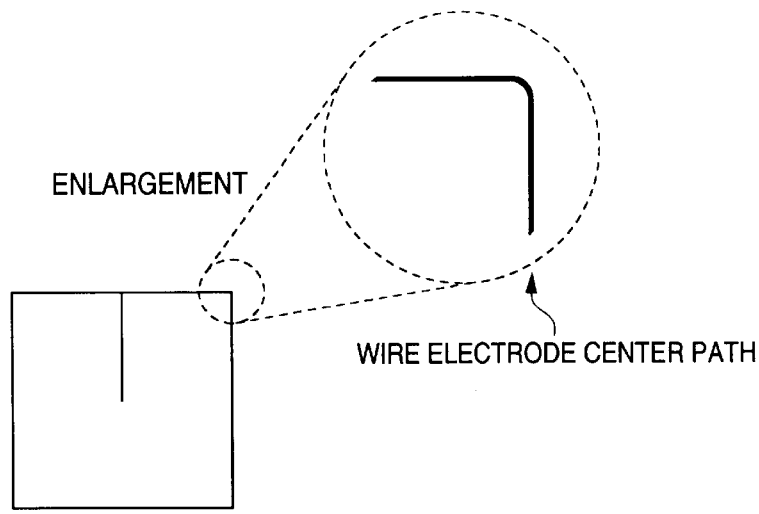
FIG. 2 is a view illustrating a display example where the machining is effected once in the embodiment 1 of this invention.
Figure 3:
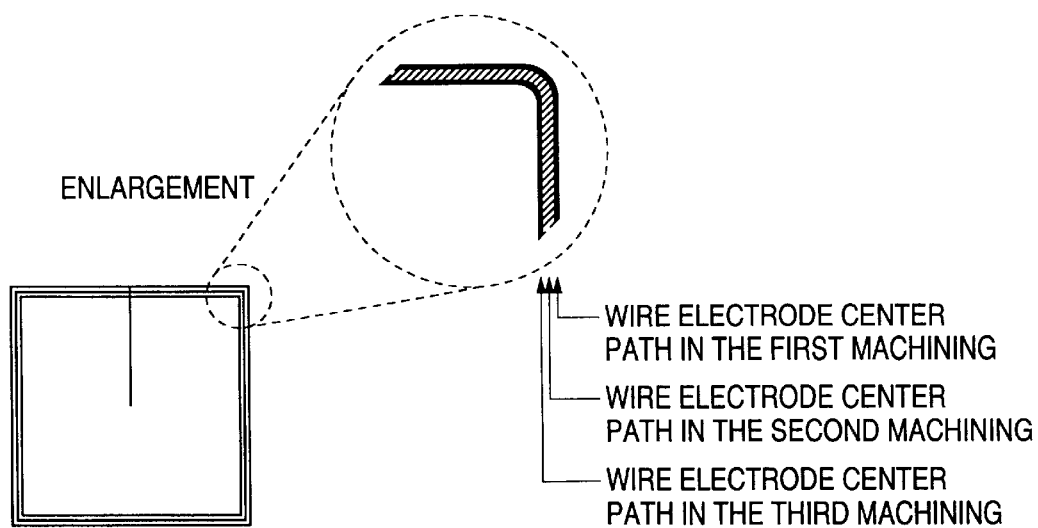
FIG. 3 is a view illustrating a display example where the machining is effected three times in the embodiment 1 of this invention.

The examples of drawing with this method are illustrated in FIGS. 2 and 3. FIG. 2 illustrates an example where the machining is effected once, and FIG. 3 illustrates an example where the machining is effected three times.

Embodiment 2

Figure 4:
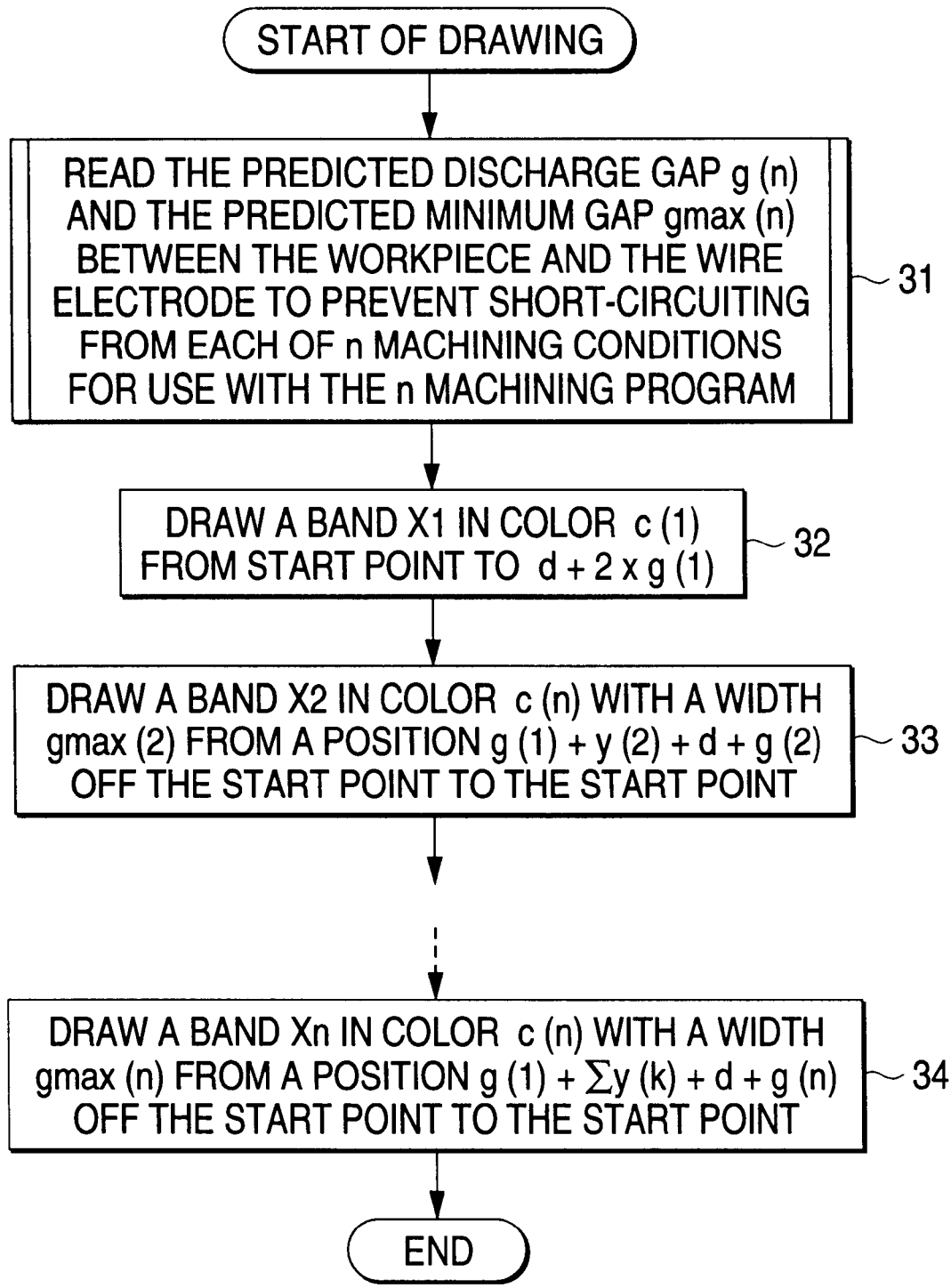
FIG. 4 is a flowchart showing an embodiment 2 of this invention.

FIG. 4 is a flowchart showing a drawing method in a wire discharge machining apparatus according to an embodiment 2 of this invention. In FIG. 4, reference numeral 31 denotes operation means for reading a predicted discharge gap g (n) and a predicted minimum gap gmax (n) between a workpiece and a wire electrode to prevent short-circuiting, which are added to the machining conditions, from the machining conditions for use with a machining program for the nth machining; 32 denotes operation means for displaying an allowance for machining in the first machining; 33 denotes operation means for displaying an allowance for machining in the second machining; and 34 denotes operation means for displaying an allowance for machining in the nth machining.

Herein, a method for determining the predicted discharge gap g and the predicted minimum gap gmax between the workpiece and the wire electrode to prevent short-circuiting which are added to the machining conditions will be described below. The predicted discharge gap g added to the machining conditions is determined in the same manner as in the embodiment 1. Also, the predicted minimum gap gmax between the workpiece and the wire electrode to prevent short-circuiting which is added to the machining conditions can be determined in such a manner that the machining is made using a target machining rate, as in the embodiment 1, and in obtaining the discharge gap G, the offset value of the discharge gap G is reduced little by little, until a short-circuit is first caused, at which time the distance between the workpiece and the wire electrode is obtained as the value gmax.

The operation will be described below. First, the operation means 31 reads the predicted discharge gap g(n) and the predicted minimum gap gmax(n) between the workpiece and the wire electrode to prevent short-circuiting from the machining conditions for use in a machining program in the nth machining. In the operation means 32, a predicted allowance for machining m(1) in the first machining can be obtained in accordance with the following expression, using a predicted discharge gap g(1) in the first machining among the data obtained by the operation means 31.

$m(1)=d+2\times g(1)$

Figure 5:
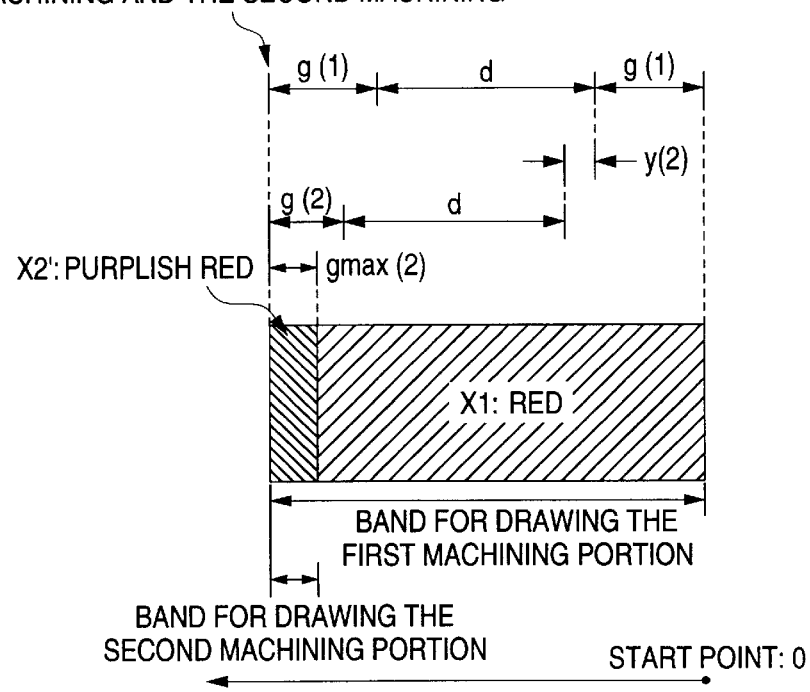
FIG. 5 is a view illustrating a display example in the embodiment 2 of this invention.
Figure 6:
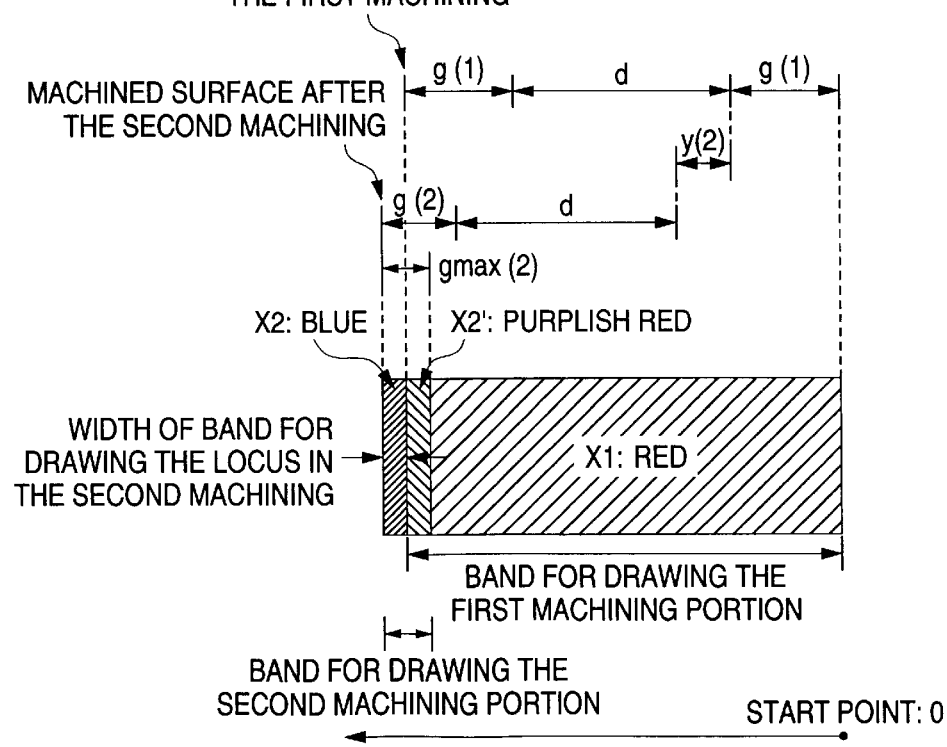
FIG. 6 is a view illustrating a display example in the embodiment 2 of this invention.
Figure 7:
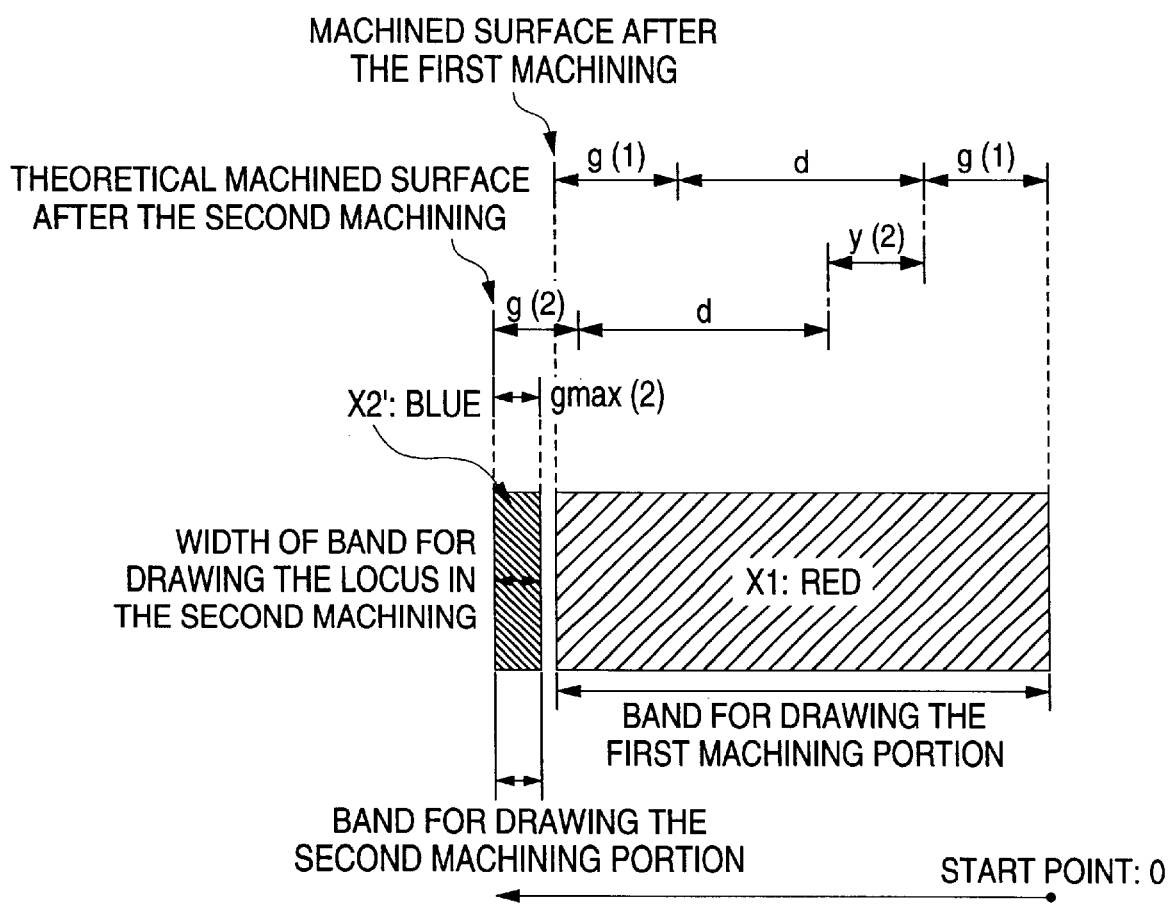
FIG. 7 is a view illustrating a display example in the embodiment 2 of this invention.
Figure 8:
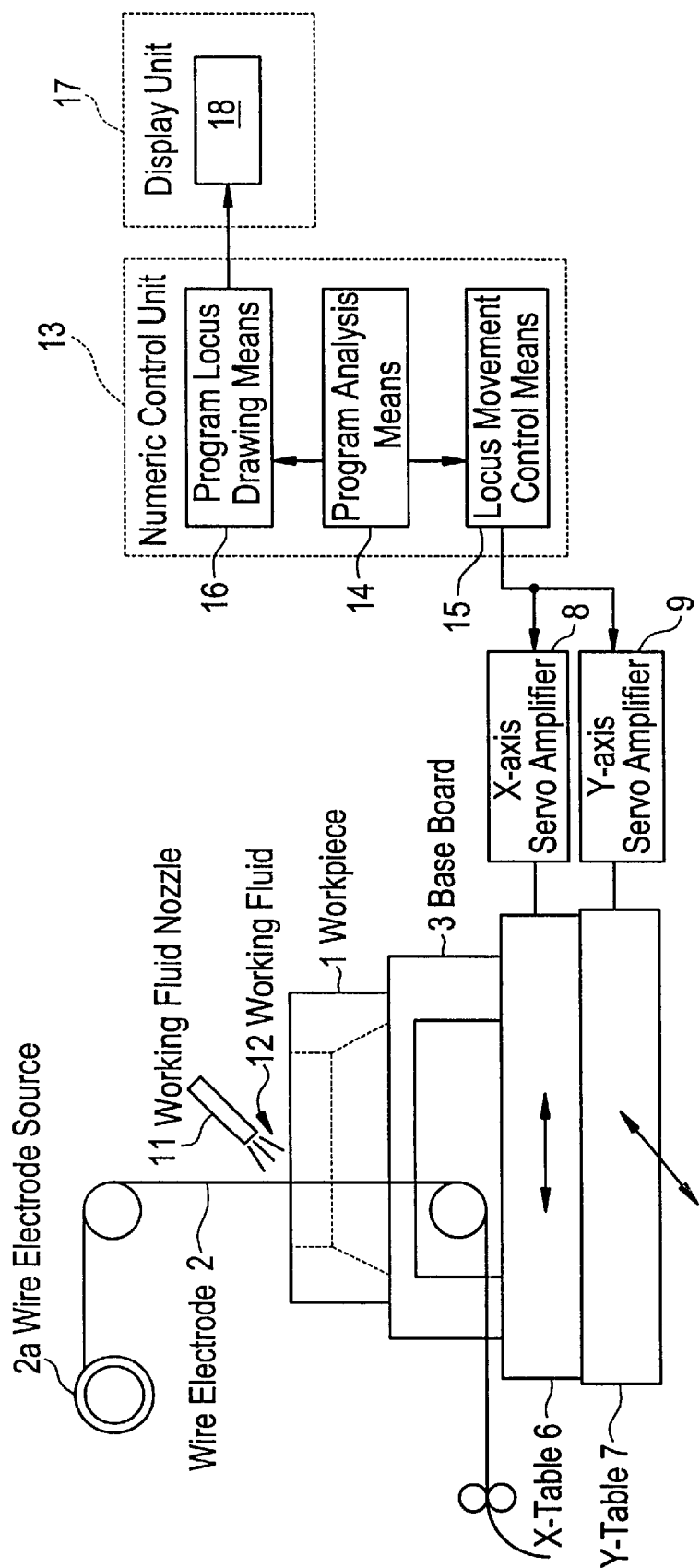
FIG. 8 is an explanatory view showing a conventional wire discharge machining apparatus.

The color for displaying the predicted allowance for machining on the display unit is varied to be distinguishable every time of machining so that the predicted allowance for machining in the nth machining is displayed in a different color c(n). Since the predicted allowance for machining in the first machining is equal to that predicted discharge portion in the first machining, a band indicating the predicted discharge portion in the first machining may be displayed in red with a width of m(1)×drawing scale (X1 in FIGS. 5 to 7), assuming that c(1) is red. Herein, as the reference for determining the position of the band indicating the predicted allowance for machining in the second and subsequent machining, the start point (o) with the width of the band drawing the predicted allowance for machining in the first machining may be employed, for example, as shown in FIGS. 5 to 7.

Then, in the operation means 33 of FIG. 4, the predicted allowance for machining m(2) in the second machining can be obtained in accordance with the following expression, using the predicted discharge gap g(2) in the second machining among the data read by the operation means 31.

$$m(2)=\{g(2)+d+y(2)+g(1)\}-m(1) =\{g(2)+d+y(2)+g(1)\}-\{d+2\times g(1)\}=\{g(2)+y(2)-g(1)\}$$

where y(n) indicates the correction amount in the nth machining.

The discharge portion in the second machining is estimated from the predicted allowance for machining m(2) in the second machining as described above. If m(2)≦0, this indicates that the predicted allowance for machining in the second machining is exactly the same as the predicted allowance for machining in the first machining, and the discharge is not effected because the correction amount for the workpiece in the second machining is insufficient. In this case, the relation between the wire electrode and the workpiece in the second machining corresponds to a state of FIG. 12. If m(2)>0, a comparison is made between the predicted minimum gap gmax (2) between the workpiece and the wire electrode to prevent short-circuiting in the second machining and m(2). If m(2)>gmax(2), this indicates that the correction amount of the wire electrode for the workpiece is so large that a short-circuit is caused. In this case, the relation between the wire electrode and the workpiece in the second machining corresponds to a state of FIG. 13. On the other hand, if 0<m(2)≦gmax(2), this indicates that the correction amount for the workpiece is appropriate, and the short-circuit can be prevented even if the wire electrode is made closer to the workpiece by an amount of gmax(2)−m(2). In this case, the relation between the wire electrode and the workpiece in the second machining corresponds to a state of FIG. 11.

To distinguish these three states, a band is displayed on the display unit. In displaying the predicted allowance for machining in the second machining on the display unit, the band display is effected with a width of gmax(2)×drawing scale from the position $\{g(1)+y(2)+d+g(2)\}$×drawing scale off the start point (o) to the start point. The portion not overlapping X1 is made X2, the display color being c(2) (e.g., blue). The portion overlapping X1 is made X2', the display color being a combination color (e.g., purplish red) of X1 and X2 to be distinguishable from X1, although the color of X1 is preferential because the portion X2' has been originally removed in the first machining. The width of X2' is a margin for the correction amount in the second machining, its width being {gmax(2)−m(2)}×drawing scale. The area of X2' is contained in the area of X1.

Similarly, the predicted allowance for machining m(n) in the nth machining can be obtained by the operation means 34 in accordance with the following expression, using the predicted discharge gap g(n) in the nth machining among the data read by the operation means 31.

$$m(n)=\{g(1)+y(2)+y(3)+\ldots+y(n)+d+g(n)\}-m(n-1)$$

The band display on the display unit is made with a width of gmax(n)×drawing scale from the position {g(1)+y(2)+y(3)+ . . . +y(n)+d+g(n)}×drawing scale off the start point (o) to the start point (o). The portion not overlapping X1 to Xn−1 is made Xn, the display color being c(n). The portion overlapping X1 to Xn−1 is displayed in a different color from c(n).

Figure 11:
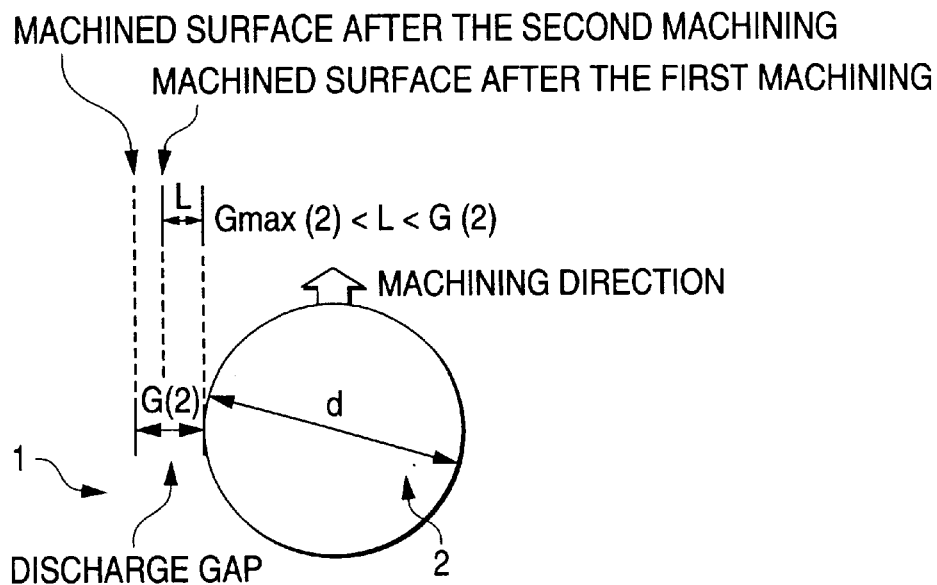
FIG. 11 is a view showing a positional relation between the wire electrode and the workpiece when the discharge machining is normally effected.
Figure 12:
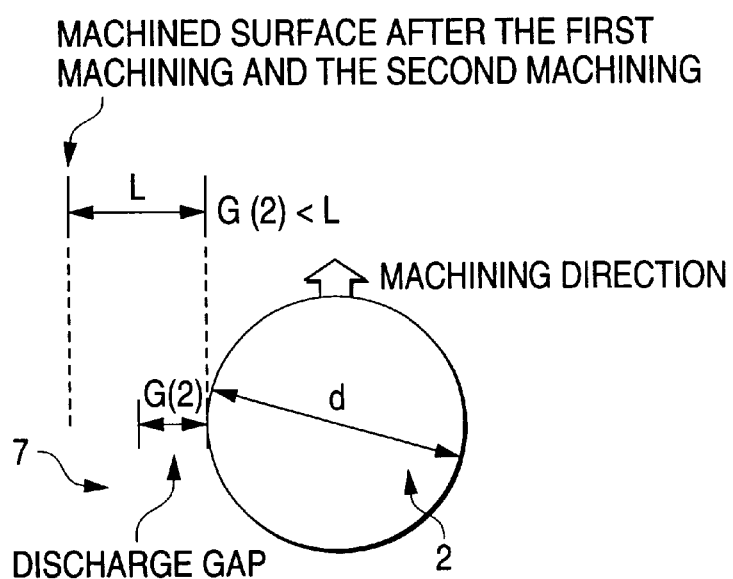
FIG. 12 is a view showing a positional relation between the wire electrode and the workpiece when the discharging is not effected due to too large distance between the surface of wire electrode and the workpiece.
Figure 13:
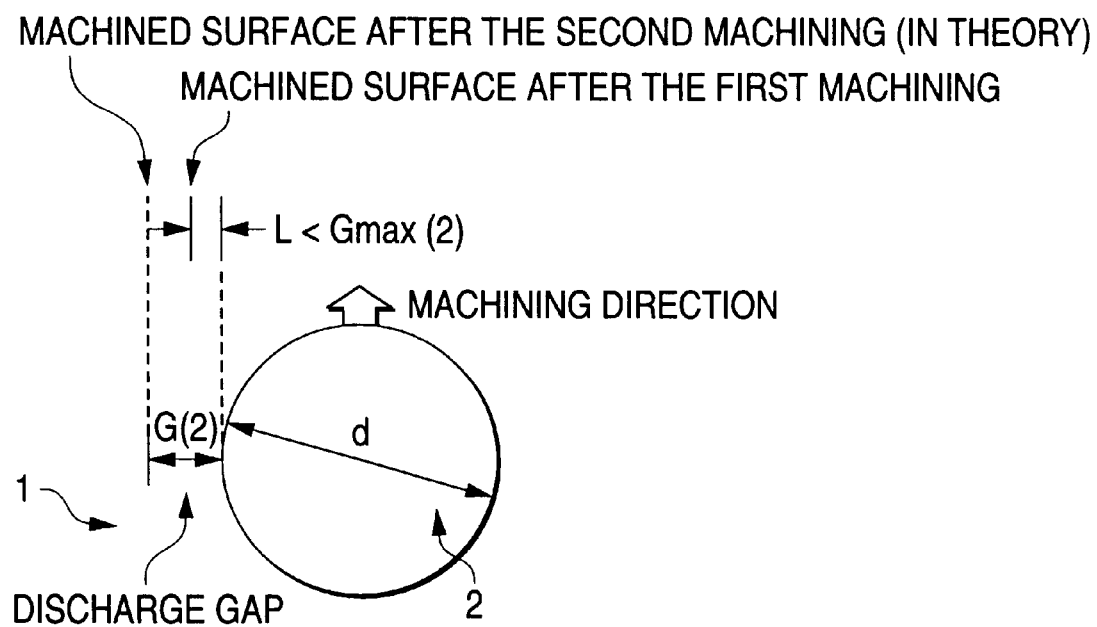
FIG. 13 is a view showing a positional relation between the wire electrode and the workpiece when the discharging is not effected due to too small distance between the surface of wire electrode and the workpiece to cause a short-circuit.

FIGS. 5 to 7 illustrate the examples of band display on the display unit as described above. FIG. 5 illustrates an example corresponding to the relation between the wire electrode and the workpiece in the second machining as shown in FIG. 12, in which the correction amount of the wire electrode for the workpiece in the second machining is too insufficient to cause a discharge. FIG. 6 illustrates an example corresponding to the relation between the wire electrode and the workpiece in the second machining as shown in FIG. 11, in which the correction amount of the wire electrode for the workpiece in the second machining is appropriate. In FIG. 6, X2 indicates the predicted discharge portion. Further, FIG. 7 illustrates an example corresponding to the relation between the wire electrode and the workpiece in the second machining as shown in FIG. 13, in which the correction amount of the wire electrode for the workpiece in the second machining is so large as to cause a short-circuit. In FIG. 7, it can be seen that there is an interval between X2 and X1, and the correction amount is too large.

This invention as constituted in the above manner has the following effects.

According to a first aspect of the invention, a wire discharge machining method includes adding a predicted discharge gap to the machining conditions and reading the amount of predicted discharge gap in doing a program check, and displaying the predicted discharge gap along with the wire electrode center path on a display unit. Therefore, a discrimination can be made whether or not the finish shape of machined workpiece is produced as specified visually every time of machining.

According to a second aspect of the invention, a wire discharge machining apparatus comprises operation means for adding a predicted discharge gap to the machining conditions and reading the amount of predicted discharge gap in doing a program check, and drawing means for displaying the predicted discharge gap along with the wire electrode center path on a display unit. Therefore, a discrimination can be made whether or not the finish shape of machined workpiece is produced as specified visually every time of machining.

According to a third aspect of the invention, the wire discharge machining apparatus according to the second aspect of the invention further comprises drawing means for displaying the predicted discharge gap along with the wire electrode center path on the display unit in a different color every time of machining. Therefore, a discrimination can be made more clearly whether or not the finish shape of machined workpiece is produced as specified visually every time of machining.

According to a fourth aspect of the invention, a wire discharge machining method includes adding a predicted discharge gap to the machining conditions and reading the amount of predicted discharge gap in doing a program check, and displaying the wire electrode center path on a display unit as a thickness of the line drawing the (d+2×g)× drawing scale that is obtained from the predicated discharge gap g and the wire electrode diameter d. Hence, the same effects as obtained by the first aspect of the invention can be achieved.

According to a fifth aspect of the invention, a wire discharge machining apparatus comprises operation means for adding a predicted discharge gap to the machining conditions and reading the amount of predicted discharge gap in doing a program check, and drawing means for displaying the wire electrode center path on a display unit as a thickness of the line drawing the (d+2×g)×drawing scale that is obtained from the predicated discharge gap g and the wire electrode diameter d. Hence, the same effects as obtained by the second aspect of the invention can be achieved.

According to a sixth aspect of the invention, the wire discharge machining apparatus according to the fifth aspect of the invention further comprises drawing means for displaying the line indicating the wire electrode center path on the display unit in a different color every time of machining. Hence, the same effects as obtained by the third aspect of the invention can be achieved.

According to a seventh aspect of the invention, a wire discharge machining apparatus comprises drawing means for displaying a predicted discharge portion on a display unit. Therefore, the predicted discharge portion can be visually confirmed and utilized to determine the correction amount.

According to an eighth aspect of the invention, the wire discharge machining apparatus according to the seventh aspect of the invention further comprises drawing means for displaying the line indicating the predicted discharge portion on the display unit in a different color every time of machining. Hence, the correction amount can be determined more effectively.

According to a ninth aspect of the invention, a wire discharge machining method includes adding a predicted discharge gap and a predicted minimum gap between the workpiece and a wire electrode to prevent short-circuiting to the machining conditions and reading the amounts of predicted discharge gap and predicted minimum gap in doing a program check, calculating a predicted allowance for machining in the nth machining from the predicted discharge gap, a correction amount of the wire electrode for the workpiece, and the wire electrode diameter, and displaying the predicted allowance for machining in the nth machining, and the predicted minimum gap for the nth machining between the workpiece and the wire electrode to prevent short-circuiting on a display unit. Therefore, one can distinguish between the situation where the discharge can not be effected due to insufficient correction amount of the wire electrode for the workpiece or due to too large correction amount of the wire electrode for the workpiece to cause a short-circuit, and the situation where the discharge can be effected because the correction amount of the wire electrode for the workpiece is appropriate. As a result, one can confirm the predicted discharge portion and determine the correction amount more effectively.

According to a tenth aspect of the invention, a wire discharge machining apparatus comprises operation means for adding a predicted discharge gap and a predicted minimum gap between the workpiece and a wire electrode to prevent short-circuiting to the machining conditions and reading the amounts of predicted discharge gap and predicted minimum gap in doing a program check, operation means for calculating a predicted allowance for machining in the nth machining from the predicted discharge gap, a correction amount of the wire electrode for the workpiece, and the wire electrode diameter, and drawing means for displaying the predicted allowance for machining in the nth machining, and the predicted minimum gap for the nth machining between the workpiece and the wire electrode to prevent short-circuiting on a display unit. Therefore, one can distinguish between the situation where the discharge can not be effected due to insufficient correction amount of the wire electrode for the workpiece or due to too large correction amount of the wire electrode for the workpiece to cause a short-circuit, and the situation where the discharge can be effected because the correction amount of the wire electrode for the workpiece is appropriate. As a result, one can confirm the predicted discharge portion and determine the correction amount more effectively.

According to an eleventh aspect of the invention, the wire discharge machining apparatus according to the tenth aspect of the invention further comprises drawing means for displaying the line indicating the predicted allowance for machining on the display unit in a different color every time of machining. Hence, the correction amount can be determined more effectively.

According to a twelfth aspect of the invention, the wire discharge machining apparatus according to the eleventh aspect of the invention further comprises drawing means for displaying a portion where the predicted minimum gap for the nth machining between the workpiece and the wire electrode to prevent short-circuiting exceeds the predicted allowance for machining in the (n−1) th machining on the display unit in a different color. Hence, the correction amount can be determined more effectively. Industrial Applicability As described above, a wire discharge machining apparatus according to this invention is suitable for the wire discharge machining operation in which a discrimination is made whether or not the finish shape of machined workpiece is produced as specified and the correction amount is determined.

What is claimed is:

1. A wire discharge machining method for machining a workpiece by applying a voltage to a machining gap between a wire electrode and the workpiece, including:
    adding a predicted discharge gap to the machining conditions and reading the amount of predicted discharge gap in doing a program check; and
    displaying said predicted discharge gap along with the wire electrode center path on a display unit.

2. A wire discharge machining apparatus for machining a workpiece by applying a voltage to a machining gap between a wire electrode and the workpiece, comprising:
    operation means for adding a predicted discharge gap to the machining conditions and reading the amount of predicted discharge gap in doing a program check; and
    drawing means for displaying said predicted discharge gap along with the wire electrode center path on a display unit.

3. The wire discharge machining apparatus according to claim 2, further comprising drawing means for displaying said predicted discharge gap along with the wire electrode center path on said display unit in a different color every time of machining.

4. A wire discharge machining method for machining a workpiece by applying a voltage to a machining gap between a wire electrode and the workpiece, including:
    adding a predicted discharge gap to the machining conditions and reading the amount of predicted discharge gap in doing a program check; and displaying the wire electrode center path on a display unit as a thickness of the line drawing the (d+2×g)×drawing scale that is obtained from said predicated discharge gap g and a wire electrode diameter d.

5. A wire discharge machining apparatus for machining a workpiece by applying a voltage to a machining gap between a wire electrode and the workpiece, comprising:

operation means for adding a predicted discharge gap to the machining conditions and reading the amount of predicted discharge gap in doing a program check; and drawing means for displaying the wire electrode center path on a display unit as a thickness of the line drawing the (d+2×g)×drawing scale that is obtained from said predicated discharge gap g and a wire electrode diameter d.

6. The wire discharge machining apparatus according to claim 5, further comprising drawing means for displaying the line indicating the wire electrode center path on the display unit in a different color every time of machining.

7. A wire discharge machining apparatus for machining a workpiece by applying a voltage to a machining gap between a wire electrode and the workpiece, comprising drawing means for displaying a predicted discharge portion on a display unit.

8. The wire discharge machining apparatus according to claim 7, further comprising drawing means for displaying the line indicating said predicted discharge portion on the display unit in a different color every time of machining.

9. A wire discharge machining method for machining a workpiece by applying a voltage to a machining gap between a wire electrode and the workpiece, including:

adding a predicted discharge gap and a predicted minimum gap between the workpiece and the wire electrode to prevent short-circuiting to the machining conditions and reading the amounts of predicted discharge gap and predicted minimum gap in doing a program check;

calculating a predicted allowance for machining in the nth machining from said predicted discharge gap, a correction amount of the wire electrode for the workpiece, and the wire electrode diameter; and displaying said predicted allowance for machining in the nth machining, and said predicted minimum gap for the nth machining between the workpiece and the wire electrode to prevent short-circuiting on a display unit.

10. A wire discharge machining apparatus for machining a workpiece by applying a voltage to a machining gap between a wire electrode and the workpiece, comprising:

operation means for adding a predicted discharge gap and a predicted minimum gap between the workpiece and the wire electrode to prevent short-circuiting to the machining conditions and reading the amounts of predicted discharge gap and predicted minimum gap in doing a program check;

operation means for calculating a predicted allowance for machining in the nth machining from said predicted discharge gap, a correction amount of the wire electrode for the workpiece, and a wire electrode diameter; and drawing means for displaying said predicted allowance for machining in the nth machining, and the predicted minimum gap for the nth machining between the workpiece and the wire electrode to prevent short-circuiting on a display unit.

11. The wire discharge machining apparatus according to claim 10, further comprising drawing means for displaying the line indicating said predicted allowance for machining on the display unit in a different color every time of machining.

12. The wire discharge machining apparatus according to claim 11, further comprising drawing means for displaying a portion where the predicted minimum gap for the nth machining between the workpiece and the wire electrode to prevent short-circuiting exceeds the predicted allowance for machining in the (n−1)th machining on the display unit in a different color.

* * * * *